United States Patent [19]

Katerberg

[11] Patent Number: 4,878,063
[45] Date of Patent: Oct. 31, 1989

[54] MULTICOLOR PRINTING APPARATUS AND METHOD HAVING VERNIER DETECTION/CORRECTION SYSTEM FOR ADJUSTING COLOR SEPARATION PLANES

[75] Inventor: James A. Katerberg, Kettering, Ohio
[73] Assignee: Eastman Kodak Company, Rochester, N.Y.
[21] Appl. No.: 280,058
[22] Filed: Dec. 5, 1988
[51] Int. Cl.$^4$ .................. G01D 18/00; G03G 13/01; H04N 1/46
[52] U.S. Cl. ........................ 346/1.1; 346/75; 346/140 R; 346/46; 430/44; 430/293; 358/75
[58] Field of Search .................. 346/1.175, 46, 140 R; 430/22, 30, 44, 293; 358/75, 78

[56] References Cited

U.S. PATENT DOCUMENTS 3,987,492 10/1976 Kraus et al. .................. 346/75
4,675,696 6/1987 Suzuki .................... 346/46

*Primary Examiner*—H Broome
*Assistant Examiner*—Gerald E. Preston
*Attorney, Agent, or Firm*—John D. Husser

[57] ABSTRACT

Method and apparatus for detecting and correcting misregistration of color separation planes in a multicolor printing process include the functions of: (i) printing on a test sheet, with a first color printing subsystem, a first array of M parallel lines which are uniformly spaced N adjustment steps apart and (ii) printing on the same test sheet with a second color printing subsystem, a second array of M parallel lines, which are uniformly spaced N+1 adjustment steps apart and which are predeterminedly juxtaposed, with respect to the lines of the first line array, so that when registration is correct, base registration lines of the first and second arrays are aligned.

Upon visually inspecting the alignment of marks on said first and second line series, the operator can effect automated position shifting of the second subsystems printout color plane in an amount and direction based on which juxtaposed mark pair of said two arrays are in best alignment.

9 Claims, 5 Drawing Sheets

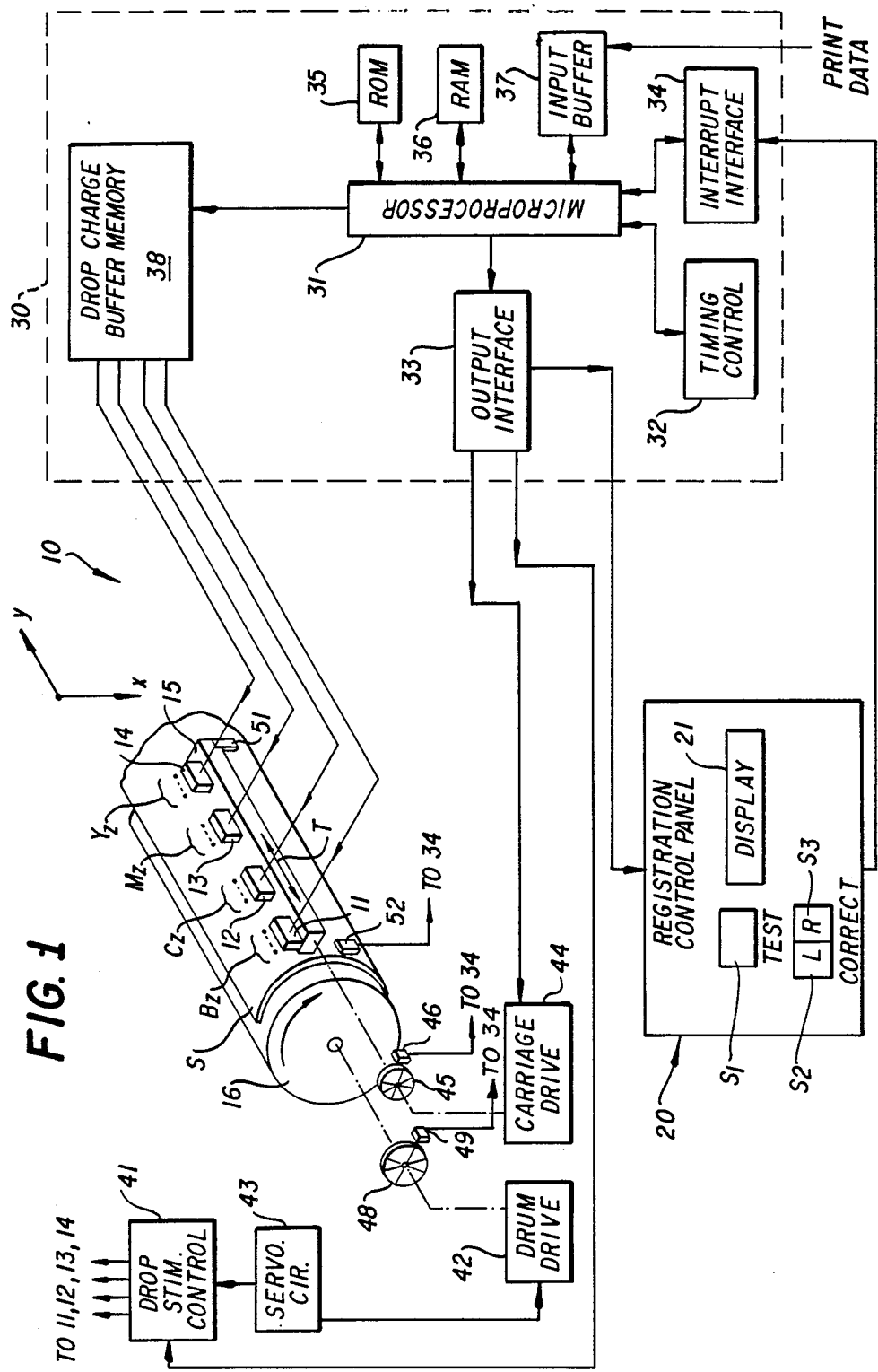

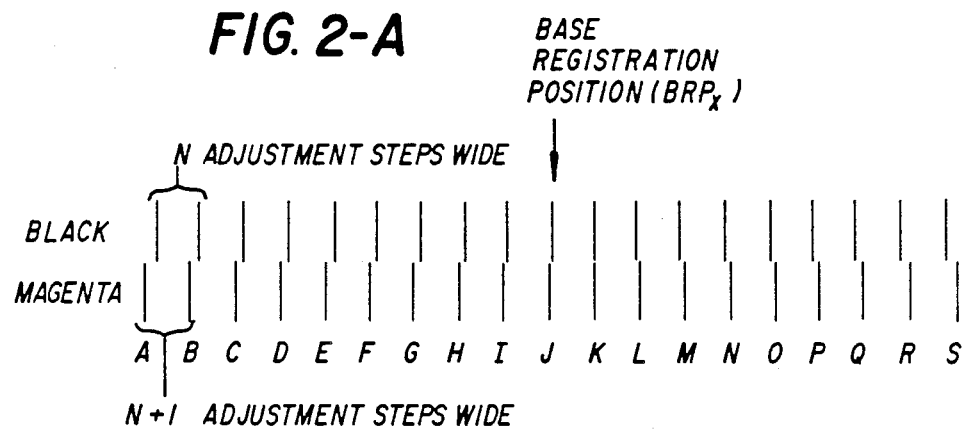
FIG. 2-A
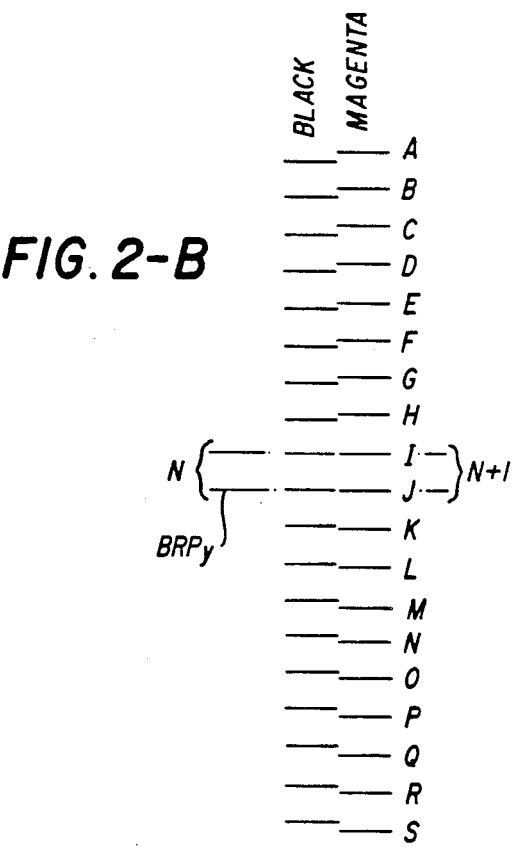
FIG. 2-B

FIG. 3

MULTICOLOR PRINTING APPARATUS AND METHOD HAVING VERNIER DETECTION/CORRECTION SYSTEM FOR ADJUSTING COLOR SEPARATION PLANES

FIELD OF INVENTION

The present invention relates to printers in which a plurality of different color component images (herein referred to as color separation planes) are printed in a register on a print medium. More specifically, the invention relates to improved printer methods and systems for detecting misalignment and correcting register of the color separation planes on the print medium.

BACKGROUND ART

In traditional printing approaches (such as off set, letterpress and gravure), as well as in electronic printing approaches (such as thermal, ink jet and laser or LED electrophotographic), there is a need to register the different color separation planes (e.g. cyan, magenta, yellow and black) that combine to form the final multicolor image. The problems that can create non-register are many and varied, depending upon the specific structures and procedures that are used in each different printing approach. For example, in multicolor ink jet printing, incorrect registration of the different color separation planes can be caused by mechanical positioning differences between actual and nominal positions (in the x or y direction) of the different-color print heads and by differences in the time of drop flight between the different-color print heads (e.g. caused by ink pressure or ink viscosity differences between those print heads.

The usual approach for correcting such errors is to visually inspect the registration of the composite multicolor image and make corrections until registration is judged acceptable. Even with specially printed out test patterns, the registration detection/correction procedure is time consuming and difficult. Moreover, the detection/correction procedure must be done by a very experienced technician, in contrast to an office environment user or "key operator".

U.S. Pat. No. 4,675,696 describes a color ink jet printer in which vertical and horizontal misregistrations of the different color separation planes are automatically detected and corrected by the printer. To implement this approach, different color test bands are printed in adjacent relations; then, the overlap or spacing between, and/or vertical offsets of, the bands are optically detected and stored in a memory system of the printer. Appropriate corrections are computed and used to electro-mechanically or electrically adjust the relative positions of the different-color separation planes printed by the print heads. This approach is conceptually elegant; however, it requires a complex optical detection system. Also, it can be subject to errors in accurately detecting the precise degree of misregistration, particularly in band overlap conditions. For example, the '969 systems relies on certain assumptions as to the "darkness" of each color and the degree of spreading of each printed test pattern portion. If papers or ink components of a system differ from the assumed normal parameters, errors in registration and correction will occur.

SUMMARY OF THE INVENTION

It is an object of the present invention to provide a printer system and procedure whereby an unskilled operator can easily effect detection and correction of color plane misregistration in multicolor printers. The present invention has the advantage of simplicity, from the printer construction viewpoint. Also the invention, is desirable for being highly accurate, with minimal likelihood of error, even when casual operators practice it.

In one aspect, the present invention constitutes a method for detecting and correcting misregistration of color separation planes in a multicolor printing process and includes the steps of: (a) printing on a test sheet with a base color printing subsystem, a first series of m parallel line marks, of adjustment step width, that are uniformly spaced n adjustment steps apart; (b) printing on the test sheet, with a second color printing subsystem, a second series of m parallel line marks, of adjustment step width, that are uniformly spaced N+1 adjustment steps apart and that are juxtaposed with respect to the base color lines in a predetermined relation such that, when registration errors are not present, the center marks of said first and second series are aligned; and (c) visually inspecting the alignment of marks in the first and second mark series and shifting the position of the second subsystem's color separation plane in an amount and direction based on the best aligned mark pair of the two series.

BRIEF DESCRIPTION OF DRAWINGS

The subsequent description of preferred embodiments refers to the accompanying drawings wherein:

FIG. 1 is a schematic diagram of one preferred system for effecting the present invention;

FIG. 2-A and 2-B are illustrations of portions of a preferred test pattern in accordance with one embodiment the present invention;

FIG. 3 is an illustration of a full four-color test pattern in accordance with one preferred embodiment of the present invention.

DETAILED DESCRIPTION OF PREFERRED EMBODIMENTS

Figure 4:
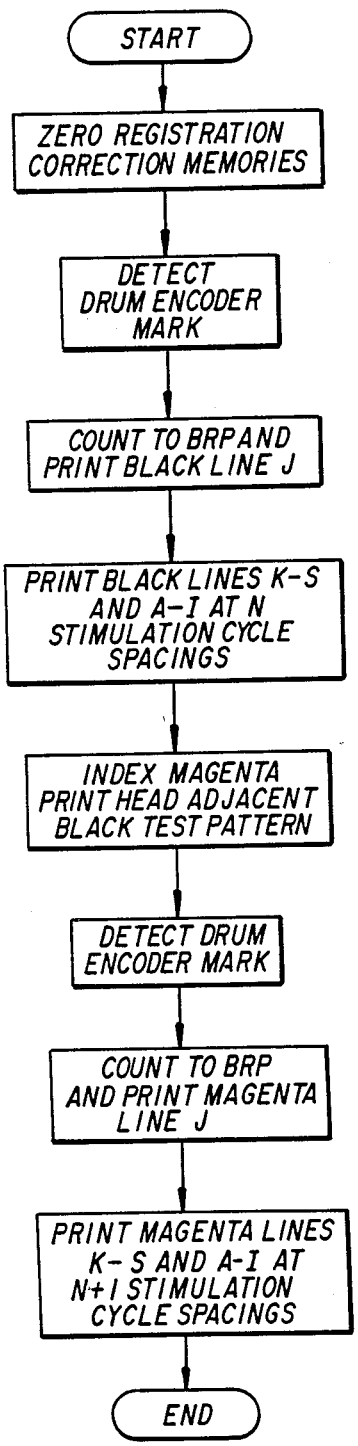
FIGS. 4 and 5 are flow charts illustrating one machine control process for implementing print out of test patterns in accordance with the present invention.
Figure 5:
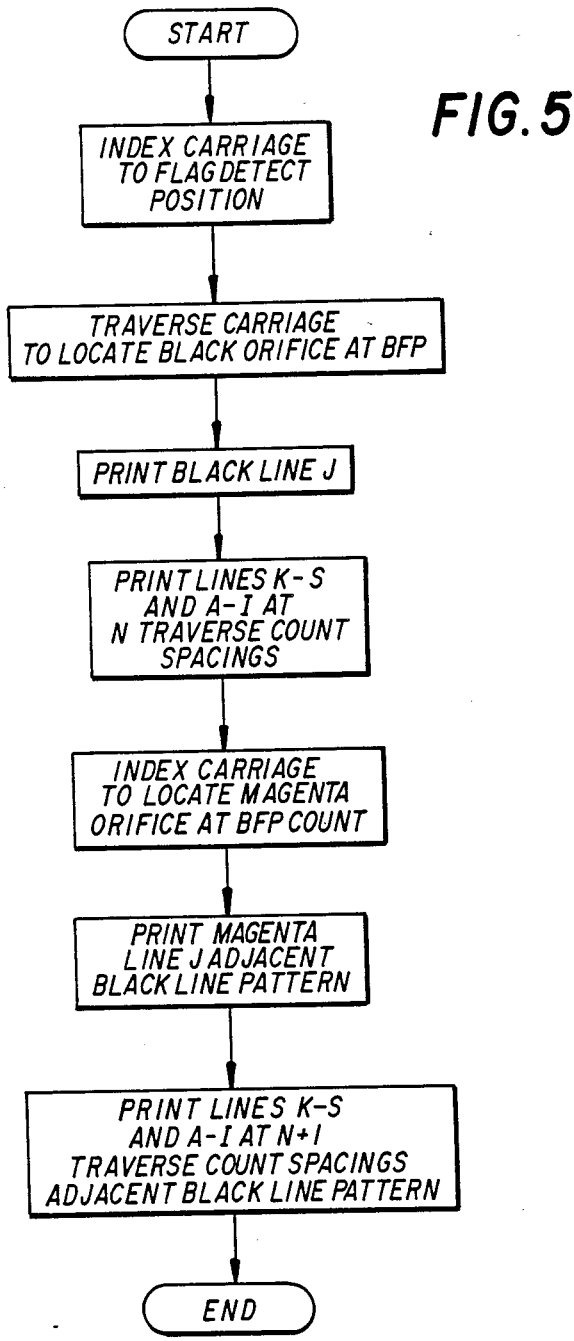

FIG. 1 shows schematically one printing system 10 embodying structure for practicing the present invention. The FIG. 1 system is a traversing head printer wherein a plurality of print heads 11, 12, 13, 14 mounted on a carriage 15, print cooperatively on a sheet media S rotated therepast on a print drum 16. Each print head is adapted to print with different colors on successive pixel zones moved there past. For this discussion it will be assumed that each print head is a continuous ink jet print head supplied with different color inks, black B, cyan C, magenta M and yellow Y. As is well known in the art, the print heads can have a plurality of spaced orifices which, in cooperation with a drop stimulation system, direct print drop streams toward the print sheet. The drops can be selectively charged and caught in accordance with an information print signal to achieve print patterns across each line segment that is moved there past.

The carriage 15 is traversable in directions T, perpendicular to the sheet feed direction, so that all print heads can address all portions of the print sheet. Thus, at the stage shown in FIG. 1 print head 11 has printed a selected black dot pattern across zone $B_z$, print head 12 has printed a selected cyan dot pattern across zone $C_z$, print head 13 has printed a selected magenta dot pattern across zone $M_z$ and print head 14 has printed a selected yellow dot pattern across zone $Y_z$. The sheet S will be rotated so that all a zones in a column aligned with the print heads can be selectively printed upon, and the carriage will then be indexed in the traverse directions T so that all different color print heads can address all sheet columns.

For purpose of explanation it will be assumed that, in the FIG. 1 embodiment, the sheet S is disposed on the platen with its length dimension along the platen axis and its top at the left end of the platen. Thus, if a page of text was printed, the top line would commence on a region in the lower left corner of the sheet as viewed in FIG. 1; and a line of text could be printed during each print drum rotation, with carriage indexing at a blank drum interval of the rotation.

To provide high quality multicolor print output, the ink drops from the different print heads should be properly registered in both the (y) direction, the traverse direction shown in FIG. 1, and in the (x) direction, the direction of sheet advance past the print head. Note that in the exemplary arrangement the (x) direction is the horizontal line direction on a print-out sheet and the y direction is the vertical direction on that sheet. As mentioned previously, print head location errors and drop flight differences can cause y direction and x direction misregistrations.

In accord with the present invention, the FIG. 1 printer is provided with a registration detection and correction system by which the operator can adjust the color planes of the cyan, magenta and yellow color separation components of the color image, relative to the color plane of the black component, to attain high quality multicolor output. In the FIG. 1 embodiment, the registration detection/correction system, in general, includes a registration control panel 20 coupled to the machine control microcomputer 30 to operate in cooperation with a program in ROM 35 of the microcomputer.

More specifically, the machine control microcomputer 30 comprises a microprocessor 31 with cooperative timing control selection 32, interrupt interface section 34, output interface section 33, read only memory (ROM) 35 and read/write memory (RAM) 36. The microcomputer 30 also includes input buffer memory sections 37 adapted to receive, store data for microprocessor 31 and output drop charge buffer memory 38. In normal printing operation print data is input to microprocessor 31, processed and stored in a known manner and output through drop charge buffer 38 to control selective charge of droplets from the print heads 11-14 and achieve the desired color image print. The microprocessor 31 also operates the drop stimulation control system 41 to provide stimulating vibrations of predetermined frequency and amplitude to the drop generators of print heads 11-14. As shown in FIG. 1, the drive 42 for rotating print drum 16 is controlled by a servo circuit 43 which receives its control signal from the drop stimulation control 41. In this manner the rotation of the drum is accurately regulated to maintain proper synchronization between the print media advance and the generation of ink droplets by the print heads. In addition the microcomputer 30 controls the drive 44 for traversing print head carriage 15 so that the print heads are indexed across the print sheet at the proper times and by the proper amounts. To effect such control an optical encoder disc 45 is coupled to the rotary drive for carriage 15 and a decoder 46 (e.g. a light source and photo detector) provides position count signals back to the microcomputer.

In accordance with the present invention a switch $S_1$, on panel 20 can be activated to signal microprocessor 31, via interrupt interface 34, to initiate a registration detection and correction program stored in ROM 35. In general, this program: (i) controls the printing system to perform a predetermined test pattern print out and (ii) instructs the operator, via display 21, how to operate "correct" switches $S_2$, $S_3$, in view of the test pattern, to adjust registration for each of the cyan, magenta and yellow color separation plans.

Before describing the details of producing and using one preferred test pattern in accordance with the present invention, a brief explanation of terminology will be useful. Thus, the term "pixel" (picture element) is used herein to mean to the size of a print dot on the sheet S, as would be generated by a single ink drop. The "normal pixel spacing" within a single color separation plane (without interlacing) is defined by the center-to-center distance between the orifices of an orifice plate array (in the y direction) and by the print drop frequency and sheet feed speed (in the x direction). By provision of a precise carriage indexing system the printer system can have the capability of advancing in a number of equal "adjustment steps" (e.g. 10) within the normal pixel spacing (orifice center-to-center distance) in the y direction. Similarly, by provision of a high frequency drop stream and accurately servoed sheet advance drum, the normal pixel spacing in the x direction can be subdivided into a number of equal "adjustment steps". The capability to address pixels in accurate increments between the "normal pixel spacing" has been used in the prior art, e.g. to increase print resolution of a single color image by interlacing or to cooperatively position different color drops in a multicolor image. In accordance with the FIG. 1 embodiment of the present invention, such capability is used to shift the different color planes in "adjustment steps" relative to one nominal color plane (e.g. the black color separation plane) to achieve proper registration.

Figure 3:
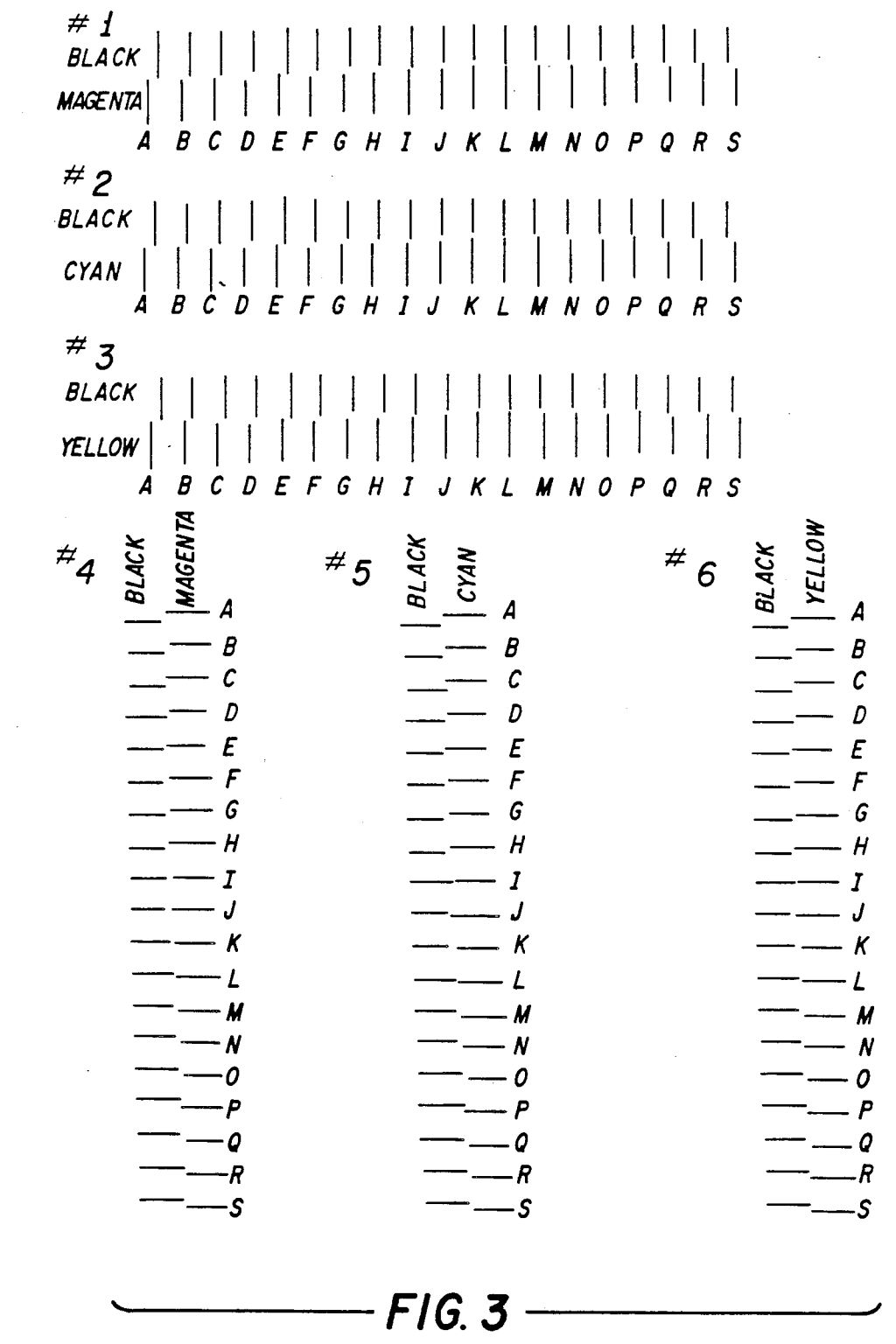

One illustrative routine for controlling printer 10 to produce a subportion of a test pattern, according to the invention, can be described with respect to FIGS. 2-5. This mode for producing test patterns is presented first because it makes the conceptual approach of the invention most easily understood. However, as described subsequently, there are other preferred approaches for printing the test patterns. Thus, upon signal from registration control 20 to microcomputer 30, a registration test pattern print out program is initiated to print two juxtaposed arrays (comprising spaced parallel lines) of the kind illustrated by the Black and Magenta line arrays shown in FIG. 2-A. The flow chart of FIG. 4, summarizes the functions performed by the printer, under control of the microcomputer 30 to print the FIG. 2-A patterns; and, as indicated, the initial step is to set the registration correction memory (e.g. located in RAM 36) to 0. The print out of the black line array is then effected by detecting a drum position encoder mark (e.g. on encoder disc 48 with decoder 49), counting a predetermined number of stimulation pulses to position the black print head 11 at the x-direction base registration position ($BRP_x$). At this position the program controls simultaneous enabling of the print drops from the nozzles of the print head 11 to print center line J of the black line array. Lines K through S of the black line array are then sequentially printed in a similar manner every n stimulation counts (re cycle periods) so that each line is spaced an integral multiple of N spaces (stimulation cycle periods x drum velocity) from the base registration point line J. As the drum completes the revolution the lines A through I are printed with a similar spacial relation to the base registration point line J.

Next the carriage is indexed so that the magenta print head 13 addresses the print line adjacent the black test pattern and the drum encoder start count mark is again detected to commence the print out of the magenta line array. The same stimulation cycle count, as with respect to the black test array, is utilized to reach the magenta base registration point $BRP_x$ and magenta line J is printed at that drum position. Next, magenta lines K-S and A-I are printed out at N+1 stimulation cycle spacings from the magenta $BFP_x$. The completed x-direction registration test pattern such as shown in FIG. 2-A is then complete. Its use in accordance with the present invention will be described below, after explanation of a preferred mode for print out of the y-direction registration pattern shown in FIG. 2-B.

Thus, referring to FIGS. 1, 2-B, and FIG. 4, the y-direction test pattern print out commences with indexing the carriage to the far left position, as viewed in FIG. 1, where carriage flag 51 will intercept position detector 52 (e.g. a light source and photocell). From this point of interception, the carriage is indexed a predetermined number of traversing counts, signalled by encoder/decoder 45, 46 to position a center orifice of print head 11 at base registration point $BRP_y$. At this carriage location the ink drops from that center orifice are enabled for a short period, sufficient to print the line J. Next the carriage is indexed to the right and left of the $BRP_y$ in increments of N traverse counts to provide print out of the Black test pattern shown in FIG. 2-B.

The Magenta test pattern shown in FIG. 2-B is printed out by first indexing the carriage the number of traverse encoder counts that would nominally locate the center orifice of print head 13 at the same location $BRP_y$, along the traverse path, as the line J of the black test pattern. Next the drops from the center orifice of the magenta print head are enabled at a drum rotation location that prints out adjacent black line J. The carriage is then traversed right and left of the $BRP_y$ in increment of N+1 traverse counts and the center orifice drops of print head 13 enabled in proper timed relation with the drum rotation to print out the Magenta test pattern as shown in FIG. 2-B.

It can be appreciated by one skilled in the art that with similar routines the microcomputer 30 can control the printer to effect print out of similar series of (N+1) spaced line marks for each of the other two colors (cyan and yellow) in juxtaposition with a series of (N spaced) black line marks for registration detection in both x and y directions. A complete print out of such a registration detection test chart is illustrated by FIG. 3. Because of the unique nature of such test chart print out, an inexperienced operator can easily detect whether the magenta, cyan and yellow color planes are properly registered (in both the x-y direction) with the black color plane. Further, if the planes are not properly registered the chart patterns indicate how much, and in which direction, particular color planes should be shifted to attain proper registration.

Thus, considering the x-direction Black-Magenta line array set (#1 in FIG. 3), it can be seen that line pair L is the "best aligned" pair in the juxtaposed line arrays, not the Base Registration Pair J. This, indicates that the magenta color plane is two adjustment steps too far to the left (in the test pattern direction) and that a shift of the magenta color plane to the right by two adjustment steps is appropriate. This can be implemented (e.g. by depressing switch $S_2$ twice) under the prompting of display 21. Alternatively, a more complete keyboard (e.g. having letters A-T) can be provided and the operator simply promoted to depress the key corresponding to the best aligned line pair.

When line arrays set #1 has been evaluated and appropriate correction keyed to panel 20, display 21 prompts consideration of other x-direction sets #2 and #3. It will can be seen that in the FIG. 3 example, that similar corrections would be appropriate. After successive panel entry of those two x-direction corrections, the operator is prompted to consider the y-direction line array set #4. There it can be seen that line pair I is the "best aligned", indicating that the magenta-color plane should be shifted one adjustment step up in the test pattern direction. Similar entries are prompted for chart sets #5, #6 and the operator color registration process is completed.

It will be appreciated by one skilled in the art, that as entries for each line array set are entered, the panel forwards a digital signal to the microcomputer 30 via interrupt interface 34, whereby microprocessor 31 can store appropriate correction data in RAM 36. These values would then be used along with the specified margin data to determine the locations for printing of each color plane. For example, for corrections in the y direction, data stored in RAM 36 can be used to adjust the relative column print positions of the print heads by appropriate increments of adjustment steps. For a unitary print head carriage such as shown in FIG. 1, this can be effected by sequentially printing out each color with appropriate traverse step corrections during each sequence. Alternatively, separate transverse drive can be provided for each print head and appropriate transverse step corrections made to each, to allow concurrent printout of different color print heads.

For adjustments in the x direction, data stored in RAM 36 can be used to adjust (delay or advance) the output of print data into buffer memory 38. This correspondingly adjusts the image information charge of drops from heads 12, 13 and 14 in relation to the advance of the sheet media. The correction values for each color plane can then be used, along with the specified left margin value, to determine the number of stimulation pulses between the drum encoder start mark and the start of printing of the supplied data for each color plane. As an example, a page with a ½" side margin and a magenta registration correction of −2 might have the 450 stimulation cycle counts between the marker pulse and start of printing black data, but 448 counts for the magenta data (450 being the appropriate number of stimulation cycles for the ½" margin.) Other modes of implementing, corrections will occur to those skilled in the art. For example, for concurrent printout of all colors, x-direction step registration corrections can be made by mechanically adjusting the print heads, as shown in U.S. Pat. No. 4,675,969 or with a micrometer screw translator.

As noted the routine for printing out test patterns that has been described with respect to FIGS. 2-5 is useful and the most straightforward toward grasping the concepts of the invention. However, other routines may be preferred from speed-of-operation and accuracy viewpoints. For example, it is preferred in connection with apparatus such as shown in FIG. 1 to print out both the x and y direction test patterns in continuous passes from marks A to S. In the y-direction pattern this avoids the need for high-tolerance carriage construction, because the back-lash problem of printing in two carriage movement directions is avoided. In the x-direction print out, the necessity to hold stimulation cycle count and synchronization with drum rotation for a complete revolution is obviated.

One skilled in the art will appreciate that a program stored in RAM 36 of the microcomputer can control print outs of the N and N+1 mark series, based on the start signals from carriage and drum detectors, so that base registration points BRF of each series would be aligned if the color planes are properly registered. Analysis and correction of patterns printed out in the continuous pass modes can be as described above.

One skilled in the art will also understand that the number M of marks in the test pattern series can vary. In general, it is desirable to have a sufficient number of marks in the series to enable compensation for the maximum number of adjustment step corrections that a given apparatus might encounter. The mark series should also be of such number that a complete shift of mark pairs will not occur (i.e. so that, e.g., mark S of the black pattern will not align with mark R of the magenta pattern). Of course, it will be understood that the test pattern mark series can be printed out in any desired color sequence, e.g. the N+1 spaced series before the N spaced series.

While the foregoing description of the invention is in a continuous ink jet printer embodiment with electronic signal correction for registration, the invention can be useful in many other printers that employ registration of a plurality of color separation images. For example drop on demand ink jet printers, thermal printers, laser scanning, LED array and light valve printers can utilize techniques to form registration test patterns such as described with respect to FIG. 3; and detection and correction can be effected similarly.

In more traditional printing the test line array sets can be formed by providing cooperating sets on the unused margins of the printing plates. Thus, color sets can be placed on the originals in the margins. Then, by means of standard color separation methods, the line arrays are individually incorporated into the color separation printing plates. Mechanical adjustments of the color separation print plates can then be effected mechanically with plate position step screws having visible screw rotation increment indicia that correspond to the adjustment steps on the margins of originals.

In reflection or projection color electrophotography the line array sets can be different color portions of a single original that is exposed at the document exposure station in the same manner as a color original to be copied. Adjustments can be made by controlling the photoconductor movement during exposure or the transfer drum or copy sheet movements at the transfer station.

The invention has been described in detail with particular reference to certain preferred embodiments thereof, but it will be understood that variations and modifications can be effected within the spirit and scope of the invention.

I claim:

1. A method for detecting and correcting misregistration of color separation planes in a multicolor printing process, said method comprising:
    (a) printing on such process print medium, with a first color printing subsystem, a first test array comprising M line marks that are uniformly spaced N adjustment steps apart;
    (b) printing on such process print medium with a second color printing subsystem, a second test array comprising M line marks that are: (i) uniformly spaced N+1 adjustment steps apart and (ii) predeterminedly juxtaposed with said first test array so that when registration of said first and second subsystems is correct, a base registration line marks of said first and second test arrays are aligned; and
    (c) visually inspecting said printed first and second test arrays and shifting the position of said second subsystems printout plane in an amount and direction based on which adjacent line mark pair of said juxtaposed arrays is in best alignment.

2. A method for detecting the degree of misregistration between the separate color planes of a multicolor printing process, said method comprising:
    (a) printing such process print medium, with a first color printing subsystem, a first series of parallel lines spaced N adjustment steps apart;
    (b) printing such process print medium, with a second color printing subsystem, a second series of parallel lines that are spaced N+1 adjustment steps apart and are juxtaposed with respect to said first series of lines; and
    (c) visually inspecting the alignment of said first and second line series to detect which juxtaposed line pair of said two series is in best alignment.

3. In apparatus for printing multicolor images of the kind having first and second color printing subsystems, a control system for detecting and correcting misregistration of the different color separation planes of those subsystems, said method comprising:
    (a) means for controlling said first subsystem to print,on a test sheet, a first test array comprising of M parallel lines that are uniformly spaced along a first direction N adjustment steps apart;
    (b) means for controlling said second subsystem to print, on said test sheet, a second test array comprising of M parallel lines marks that are: (i) uniformly spaced along said first direction N+1 adjustment steps apart and (ii) predeterminedly juxtaposed with respect to said first test array such that, when registration of said subsystems is correct, base registration lines of said first and second test arrays are aligned; and
    (c) means for adjusting the relative position of said subsystems' printout, along said first direction, an amount based on which juxtaposed line pair of said two test array printouts are in best alignment.

4. The invention defined in claim 3 further comprising:
    (a) means for controlling said first color printing subsystem to print, on a test sheet, a third series of M parallel line marks which are uniformly spaced along a second direction orthogonal to said first spacing direction N adjustment step apart;
    (b) means for controlling said second color printing subsystem to print, on said test sheet, a fourth series of M parallel line marks, which are uniformly spaced along said second direction, N+1 adjustment steps apart and which are juxtaposed with respect to said third line series so that when registration errors are not present base registration marks of said third and fourth series are aligned; and (c) means for shifting the position of said second subsystems printout color plane along said second sheet direction in an amount based on which juxtaposed mark pair of said third and fourth series is in best alignment.

5. A method for detecting and correcting misregistration of color separation planes in a multicolor ink jet printing process, said method comprising:

(a) printing on a test sheet with a first ink jet subsystem, a first series of M parallel lines which are uniformly spaced, along a first print sheet direction, N adjustment step apart;

(b) printing on said test sheet with a second ink jet subsystem, a second series of M parallel lines which are uniformly spaced along said first print sheet direction, N+1 adjustment steps apart and which are juxtaposed with respect to said first series lines so that, when registration of said ink jet subsystems along said first print sheet direction is correct, central, base registration lines, respectively of said first and second series, are aligned; and (c) visually inspecting the alignment of marks on said first and second line series and shifting the position of said subsystems' printout color plane(s) along said first print sheet direction an amount based on which juxtaposed line pair of said first and second series are in best alignment.

6. The method defined in claim 5, further comprising:

(a) printing on said test sheet, with said first ink jet subsystem, a third series of M parallel lines which are uniformly spaced, along a second print sheet direction, N adjustment step apart;

(b) printing on said test sheet with said second ink jet subsystem, a fourth series of M parallel lines which are uniformly spaced, along said second print sheet direction, N+1 adjustment steps apart and which are juxtaposed with respect to said second series lines, so that when registration of said ink jet subsystems in said second print sheet direction is correct, central, base registration center lines respectively of said third and fourth series, are aligned; and (c) visually inspecting the alignment of marks on said first and second line series and shifting the position of said subsystems' printout color plane(s) along said second print sheet direction an amount based on which juxtaposed line pair of said third and fourth series are in best alignment.

7. The method defined in claim 5 further comprising:

(a) printing on said test sheet, with said first color printing subsystem, a third series of M parallel lines which are uniformly spaced, in a second print sheet direction, N adjustment step apart;

(b) printing on said test sheet with said second color printing subsystem, a fourth series of M parallel lines which are uniformly spaced, in said second print sheet direction, N+1 adjustment steps apart and which are juxtaposed with respect to said second series lines, so that when registration of said color printing subsystems in said second print sheet direction is correct, central, base registration lines respectively of said third and fourth series, are aligned; and (c) visually inspecting the alignment of said first and second line series and shifting the position of said subsystems' printout color plane(s) in said second print sheet direction an amount based on which juxtaposed line pair of said third and fourth series are in best alignment.

8. In ink jet printing apparatus of the kind having a plurality of different color printing subsystems, a color system for detecting and correcting misregistration of the color planes of such subsystems, said control system:

(a) means for controlling a first color printing subsystems to print, on a test sheet, a first color series of M parallel line marks, which are uniformly spaced in a horizontal sheet direction N adjustment step apart;

(b) means for controlling a second color printing subsystem to print, on said test sheet, a second color series of M parallel line marks, which are uniformly spaced in said horizontal sheet direction N+1 adjustment steps apart and which are juxtaposed with respect to said first color lines so that when registration errors are not present base registration marks of said first and second color series are aligned; and (c) means for shifting the position of said second subsystem's printout color plane along the horizontal sheet direction in an amount and direction based on which juxtaposed mark pair of said two series is in best alignment.

9. The invention defined in claim 8 further comprising:

(a) means for controlling said first color printing subsystem to print, on a test sheet, a third series of M parallel line marks which are uniformly spaced in a vertical sheet direction N adjustment step apart;

(b) means for controlling said second color printing subsystem to print, on said test sheet, a fourth series of M parallel line marks, which are uniformly spaced in said vertical sheet direction, N+1 adjustment steps apart and which are juxtaposed with respect to said third line series so that when registration errors are not present the base registration marks of said third and fourth series are aligned; and (c) means for shifting the position of said second subsystems printout color plane along the vertical sheet direction in an amount and direction based on which juxtaposed mark pair of said third and fourth series is in best alignment.

* * * * *

UNITED STATES PATENT AND TRADEMARK OFFICE
CERTIFICATE OF CORRECTION

PATENT NO. : 4,878,063
DATED : October 31, 1989
INVENTOR(S) : James A. Katerberg It is certified that error appears in the above-identified patent and that said Letters Patent is hereby corrected as shown below:

Column 10, line 16, "color" (second occurrence) should be --control--

Signed and Sealed this

Eighteenth Day of September, 1990

Attest:

HARRY F. MANBECK, JR.

Attesting Officer

Commissioner of Patents and Trademarks